United States Patent [19]
Knirsch et al.

[11] Patent Number: 4,836,852
[45] Date of Patent: Jun. 6, 1989

[54] INK FOR AN INK JET PRINTER

[75] Inventors: Franco Knirsch; Anna M. Soudaz; Alessandro Genova, all of Turin, Italy

[73] Assignee: Ing. C. Olivetti & Co., S.p.A., Ivrea, Italy

[21] Appl. No.: 84,871

[22] Filed: Aug. 13, 1987

[30] Foreign Application Priority Data

Sep. 1, 1986 [IT] Italy ................... 67683 A/86

[51] Int. Cl.$^4$ ............................................. C09D 11/02
[52] U.S. Cl. ....................................... 106/22; 106/23; 106/400; 106/472
[58] Field of Search ............... 106/22, 23, 308 Q, 472, 106/400

[56] References Cited

U.S. PATENT DOCUMENTS

| | | | |
|---|---|---|---|
| 4,239,543 | 12/1980 | Beasley | 106/22 |
| 4,502,054 | 2/1985 | Brescia et al. | 346/75 |
| 4,503,442 | 3/1985 | Barbero et al. | 346/140 |
| 4,593,296 | 6/1986 | Dagna | 346/140 |
| 4,595,937 | 6/1986 | Conta et al. | 346/140 |
| 4,595,938 | 6/1986 | Conta et al. | 346/140 |

OTHER PUBLICATIONS

Derwent Abstract Accession No. 77-40237y/23, German Patent No. DE 2647678, Jun. 2, 1977.
Derwent Abstract Accession No. 80-11946c/07, Japanese Patent No.J55002054, Jan. 9, 1980.
Derwent Abstract Accession No. 80-38722c/22, European Patent No. 11480, May 28, 1980.

Primary Examiner—Amelia Burgess
Attorney, Agent, or Firm—Banner, Birch, McKie & Beckett

[57] ABSTRACT

The ink is formed by a solution of a direct dye in a mixture of water and glycol wetting agents, to which a pigment which is finely ground to particles of dimensions of not more than 1000 Å is added in dispersion, in a concentration of between 0.1 and 2%. The pigment particles serve to anchor the gaseous nuclei of gases which are dissolved in the ink for the purpose of stabilizing the boiling point of the ink. The ink is particularly suited to an ink jet printer of the type in which expulsion of the droplets is produced by causing instantaneous vaporization of a portion of ink in a nozzle.

9 Claims, 1 Drawing Sheet

INK FOR AN INK JET PRINTER

BACKGROUND OF THE INVENTION

The present invention relates to an ink which is particularly suitable for an ink jet printer of the kind referred to as the bubble type, in which expulsion of the droplets of ink is effected by the on-demand production of instantaneous vaporisation of a portion of ink in a nozzle. More particularly the invention relates to an ink which is essentially formed by an aqueous solution of a direct dye in a mixture of water and glycol wetting agents.

Various inks of the above-indicated kind are known, for example from U.S. Pat. No. 3,846,141 and U.S. Pat. No. 3,856,536, in which the dye is completely dissolved in the mixture which may also contain solubilising agents. Such inks which are used in a bubble-type ink jet printing element cause irregular expulsion of the drop due to electrothermal phenomena such as irregular absorption of current and over-boiling of a portion of ink. The printing is thus of poor quality, with dots which are not clear and which are in part missing.

U.S. Pat. No. 4,365,053 also discloses an ink in which the mixture includes a solvent formed by alcohol with a low boiling point, a soluble resinous component and water while the dye is formed by a white inorganic pigment with particles of a diameter up to 5 μm, which is formed by titanium oxide which has a very high specific weight and which is in suspension in a resinous binder. The ink on the one hand is particularly suitable for a continuous ink jet printer in which a certain amount of ink is intended to circulate more than once through the nozzle, while on the other hand it is suitable for printing on dark carriers of plastics, glass or metal, in which the white pigment provides a sufficient contrast for reading purposes while the resinous component serves as a fixative. That ink is not suitable for printing on white paper, nor for on-demand printing devices, since in the absence of circulation of the ink, the pigment tends to form a sediment. In addition, due to evaporation of the water even upon short interruptions in operation of the printer, the resinous component suffers from encrustation and rapidly clogs the nozzles.

Finally, inks of the above-indicated type are known, for example from U.S. Pat. No. 4,373,954 and U.S. Pat. No. 4,536,776, in which a predetermined level of conductivity is achieved in order to attain the desired absorption of current in the ink, with a given control pulse. Those inks however do not ensure regular vaporisation of the ink to form the bubble so that the absorption of current in each pulse is liable to vary enormously.

In order to ensure a certain degree of regularity in the formation of the bubble, our published European patent application No. EP 0205243 also proposed providing for control of the printing element by means of a first pulse for heating the ink, followed by a vaporisation pulse. The heating pulse is controlled by a regulating circuit with a negative temperature constant, which reduces the effect of ambient temperature on the moment of initiating boiling. However, even with that control, the inks which are known hitherto do not make it possible to achieve a constant boiling temperature so that vaporisation and thus bubble formation are not regular, nor are they perfectly synchronised with the control pulse.

SUMMARY OF THE INVENTION

The object of the present invention is to provide an ink for an ink jet printer wherein the jet is produced thermally or electrothermally, which has a constant boiling temperature and which permits perfect and regular bubble formation for expulsion of the droplets of ink.

To that end, the ink according to the invention is characterised in that the ink comprises a solid material which is finely crushed so as to produce particles of dimensions not greater than 1000 Å in a level of concentration of between 0.1 and 2% by weight of the ink, this material being held in dispersion and being capable of anchoring gaseous nucelei of gases dissolved in the ink. These and other features of the invention will be more clearly apparent from the following description of some preferred embodiments and the accompanying drawing.

DETAILED DESCRIPTION OF THE PREFERRED EMBODIMENTS

Figure 1:
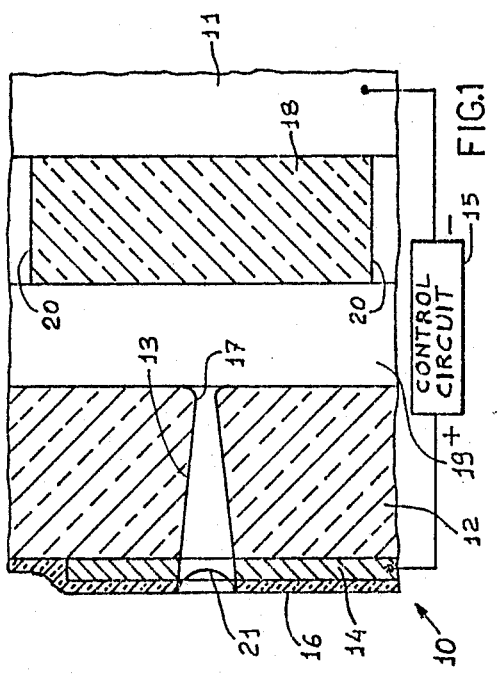
FIG. 1 is a diagrammatic view of an ink jet printing element using the ink according to the invention.

Referring to FIG. 1, reference numeral 10 generally indicates on a greatly enlarged scale an on-demand ink jet printing element for an electrically conductive ink. The printing element 10 is essentially incorporated into an ink container 11 (only part of which is shown in FIG. 1) which is closed by a plate 12 in which there is provided a capillary nozzle 13 for the expulsion of particles of ink. Disposed on the outside surface of the plate 12 is a layer of conducting material as indicated at 14, which forms an electrode of the element 10 and which is connected to a control circuit 15. The circuit 15 is connected to another electrode (not shown in the drawing) which is disposed in the container 11 so as always to be in contact with the ink. The plate 12 and the layer 14 are covered by a wear-resistant glass layer 16.

The nozzle 13 is formed by drilling the plate 12 together with the layers 14 and 16 in such a way as to produce a minimum section 17 of a diameter of between 25 and 35 μm in the vicinity of the internal wall surface of the plate 12. Fixed in the container 11 is a plate 18 which is disposed in a position corresponding to the nozzle 13 at a spacing therefrom of the same order of magnitude as the thickness of the plate 12. The plate 18 is provided with openings 20 which permit the ink in the container 11 to fill both a cavity 19 between the two plates 12 and 18 and the nozzle 13 in which a meniscus 21 is normally formed.

By causing the circuit 15 to generate a voltage pulse, since the ink is electrically conductive, an electrical current is generated between the external electrode 14 and the internal electrode, that current causing a rise in temperature in the ink. The temperature rises to a level which is proportional to increasing current density, reaching the maximum value in the narrowest section 17 of the nozzle 13. At the boiling temperature of the ink in that section, vaporisation of a part of the ink occurs, thus forming a bubble of vapour which causes expulsion of the ink which is between the bubble and the meniscus 21.

As described in the aforementioned EP-A C205243, the power required for forming the bubble may be supplied by means of two consecutive pulses. The first pulse serves to heat the ink in such a way as to raise its temperature to a little below the boiling point while the second pulse supplies the energy necessary for the vaporisation effect and thus causes boiling at the desired time, thereby reducing the effect of variation in ambient temperature on the boiling phenomenon.

It is known that in any change in phase of a material, there is a certain inertia or reaction to that change so that the material tends to remain in the phase in which it is to be found. When going from a liquid to a gas, that inertia requires over-boiling heat, that is to say an increase in the boiling point which is a matter of some degrees in normal heating systems. On the other hand that increase in temperature may be very high in a type of rapid localised heating.

It is known that boiling of a liquid is turbulent vaporisation of part of the liquid which begins when the boiling point is exceeded, with the above-mentioned inertia, at least in part of the liquid. Vaporisation forming bubbles therefore takes place as from gaseous nuclei which are already present in the liquid. Such nuclei are generally formed by microscopic bubbles of air or gas which are anchored to the roughness of the wall surfaces or the solid impurities which are to be found in the liquid.

Thus the commencement of boiling may be considered as a probabilistic phenomenon which can occur in a range of temperatures between the theoretical boiling temperature and the critical point temperature of which no trace of material remains in the liquid state. The critical point temperature for water is 374° C.

The probability of bubble formation increases with the increase in temperature and is linked to the presence of the above-mentioned nuclei and the dimensions thereof. In the nozzle of an ink jet printing element such as that shown in FIG. 1, because of the small volume involved in the heating effect and the vaporisation phenomenon, the probability of the presence of gaseous nuclei is very slight so that vaporisation may occur at a variable temperature between 100° and 374° C. The phenomenon of over-boiling is therefore very considerable and requires irregular absorption of current from the control circuit. The result is that the known inks which are based on aqueous solutions of direct dyes, glycol wetting agents, solubilising agents and additives of electrolytic salts to achieve the desired conductivity in the ink give rise to poor printing quality with various blurred or downright missing dots.

In accordance with a feature of the invention, the inking mixture formed by an aqueous solution of a direct dye has added thereto a dispersion of a solid finely crushed material such as to provide solid particles of a diameter of not greater than 1000 Å. Those particles have the capacity to regularise the boiling temperature, acting as centres of attraction for the gaseous nuclei of the gases dissolved in the ink, which promote the formation of the bubbles of vapour, thereby reducing the inertia of the liquid upon the change in phase and regularising the boiling temperature. Preferably the solid material is formed by a pigment of similar colour compatible with that of the direct dye in the solution.

It will be appreciated that the ink must have the optimum chemicalphysical characteristics for the printing process such as electrical conductivity, viscosity, pH-value, surface tension to ensure good penetration into the paper, bright colouring and quick drying, avoiding the formation of clots or blockages which, as will be seen in greater detail hereinafter, are characteristic of inks in which the colourisation effect is entrusted only to pigments.

The inks according to the embodiments of the invention are all water-based, with a level of electrical resistivity of between 110 and 140 ohm.cm, a viscosity of between 1.5 and 3.5 cSt, a surface tension of between 35 and 40 dynes/cm and a degree of acidity of between pH 6.8 and pH 8.7. The resistivity of those inks may be achieved by means of a suitable concentration of electrolytes such as lithium chloride (LiCl) when the resistivity produced by dissociation of the dye is inadequate.

Added to the water which is the main solvent of the dye is a wetting agent of glycol type formed by glycols, polyglycols, etherglycols or a mixture thereof. Polyethylene glycol with a molecular weight (MW) of 200 is preferably used. In the case of coloured inks which produce various colours by the superimposition of inks of primary colours, since such superimposition would increase the drying time, it is possible to add to the ink an etherglycol such as polyethylene glycol phenyl ether, in order to facilitate penetration of the ink into the paper. In that way the drying time remains substantially the same as that of black ink so that the speed of printing is not reduced. Those wetting agents which perform the function of preventing encrustation in the nozzle are used at a level of concentration of between 70 and 300 g/liter of ink.

Those inks are formulated by using dyes which are preferably of direct type and which have a high level of solubility and good stability with respect to light and good thermal stability, and in a level of concentration of the anhydrous dye of between 0.1 and 10% by weight of the ink. Among the dyes for black inks it is possible to use Duasyn Direkt Schwarz H-SF produced by Hoechst which is a direct anhydrous black dye and which is catalogued in the Color Index under the group No 171, or Fastusol Schwarz 18L produced by BASF, which is an aqueous solution with 30% of anionic direct black dye. The following may be used for coloured inks: the yellow dye 'IJ-2' from Hodogaya, catalogued in the COLOR INDEX under the group No 144, the cyan dye 'Water Blue Special 9' from Kayaku Nippon and the magenta dye 'J-I-M10' from Sumitomo. Those dyes are in the anhydrous state. For black inks, the preferred level of concentration of the anhydrous dye is between 3 and 9% by weight of the ink while for coloured inks it is between 0.25 and 2% by weight of the ink.

It is also possible to add to the ink pH-value regulating additives such as monoethanol amine, diethanol amine or triethanol amine in order to adjust the pH-value to between 6.8 and 8.7, and being such as to ensure complete stable solubilisation of the dye. In addition, with some types of dye, it is possible to add solubilising agents such as N-methyl pyrrolidone and derivatives thereof. Finally, it is possible to add preserving agents or biocidal agents such as Omadine from Olin Corp., to inhibit the growth of micro-organisms in the event of storage for prolonged periods. It is also possible to add an antifoam additive such as OL3 from Wacker to regulate surface tension so as to prevent foam from interrupting the emission of the ink.

In order to promote the formation of gaseous nuclei in the ink, a pigment of a similar colour and compatible with that of the dye is added to the ink. The pigment must be finely ground or crushed so as to form solid particles of pigment. It may be in the form of an aqueous dispersion of carbon for black inks and aqueous dispersions of organic pigments for coloured inks.

The surface-active characteristics of such dispersions are preferably of non-ionic type. The optimum dimensions of the pigments must be less than 1000 Å, preferably between 400 and 1000 Å. The percentage of anhydrous pigment present in the ink may vary between 0.1 and 2% by weight of the ink. Preferably that percentage may be between 0.6 and 1.8% by weight of the ink. The relationship between the anhydrous pigment and the anhydrous dye may vary between 1/15 and 6/1. In particular in black inks the percentage may vary between 1/15 and 2/10 while in coloured inks it may vary between 1/1 and 6/1.

The addition of pigment in such inks is not essential to increase the optical density of the printed dots, although it contributes to making the dots clear and sharp. However the pigment serves primarily to regularise and stabilise the thermal behaviour of the ink during the boiling phenomenon, for the above-mentioned reasons. The stabilisation effect ensures correct electrical functioning of the system which results in an improved and constant quality of printing.

The following may be preferred, among pigments for black ink: Hostatint produced by Hoechst which is an, or Aquablak 135 produced by Borden, which is a colloidal nonionic paste predispersed with carbon black. For coloured inks, it is possible to use yellow Flexonyl Gelb DGR from Hoechst, cyan Helio Blau BRZ from Bayer, and magenta Heliorot GZ from Bayer.

All those pigments are supplied in the form of a 30% aqueous dispersion and comprise dispersing agents to prevent agglomeration of the particles of pigment. Alternatively, it is possible to use solid pigments in powder form by preparing a dispersion similar to the commercially available dispersions first referred to above, with the addition of the dispersing agent.

Preparation of the inks may be effected in the following manner. The necessary amount of doubly distilled water is weighed and poured in a suitable glass vessel. The various additives are added: biocidal agent, pH-regulating agent, electrolyte and optionally surface-active and anti-foam additives, and the mixture is agitated so as to cause complete dissolution of the additives. The appropriate percentage of wetting agent (polyethylene glycol and if necessary also etherglycol) is then added and agitated until completely dissolved. The dye is then added and agitated for some hours in order to ensure that it is completely dissolved. The dispersion of pigment is subsequently added and agitated for at least 12 hours in order to ensure homogeneous dispersion of the pigment in the ink. Finally, the ink is filtered with a glass fibre filter with a level of porosity of 3 μm and poured into the appropriate packaging which is sealed.

The following examples set forth the composition and the physical characteristics at a temperature of 25° C. of some inks which, tried out in the printing process described with reference to FIG. 1, give optimum results with sharply focussed dots of constant size, the absence of clogging in the nozzle, the absence of missing dots and substantially low and constant values in respect of current intensity.

| Example 1 (black ink) | |
| --- | --- |
| Demineralised water | 57.8 g |
| Polyethylene glycol MW 200 | 10.0 g |
| Fastusol Schwarz 18L (Dye) | 30.0 g |
| Aquablak 135 (Pigment) | 2.0 g |
| Biocidal agent | 0.2 g |
| Surface tension | 44.2 dynes/cm |
| Viscosity | 2.33 cSt |
| Resistivity | 122.0 ohm · cm |
| pH-value | 7.4 |
| Example 2 (black ink) | |
| Demineralised water | 57.8 g |
| Polyethylene glycol MW 200 | 10.0 g |
| Fastusol Schwarz 18L (Dye) | 30.0 g |
| Hostatint (Pigment) | 2.0 g |
| Omadine | 0.2 g |
| Surface tension | 43 dynes/cm |
| Viscosity | 2.5 cSt |
| Resistivity | 114 ohm · cm |
| pH-value | 7.4 |
| Example 3 (black ink) | |
| Demineralised water | 69.0 g |
| Ethylene glycol | 20.0 g |
| Propylene glycol | 5.0 g |
| LiCl | 1.0 g |
| Duasyn Direkt Schwarz H-SF (Dye) | 3.0 g |
| Aquablak 135 (Pigment) | 2.0 g |
| Surface tension | 36.4 dynes/cm |
| Viscosity | 3.4 cSt |
| Resistivity | 113.6 ohm · cm |
| pH-value | 7.2 |
| Example 4 (yellow ink) | |
| Demineralised water | 83.25 g |
| Polyethylene glycol MW 200 | 9.50 g |
| 1-methyl-2-pyrrolidone | 1.00 g |
| Polyethylene glycol phenyl ether | 0.50 g |
| LiCl | 0.50 g |
| Hodogaya IJ-2 (Dye) | 0.25 g |
| Flexonyl Gelb (Pigment) | 5.00 g |
| Surface tension | 40.9 dynes/cm |
| Viscosity | 1.5 cSt |
| Resistivity | 123.5 ohm · cm |
| pH-value | 6.8 |
| Example 5 (cyan ink) | |
| Demineralised water | 82.0 g |
| Polyethylene glycol MW 200 | 9.5 g |
| 1-methyl-2-pyrrolidone | 1.0 g |
| Polyethylene glycol phenyl ether | 0.5 g |
| LiCl | 0.5 g |
| Water Blue Special 9 (Dye) | 1.5 g |
| Helio Blau BRZ (Pigment) | 5.0 g |
| Surface tension | 39.1 dynes/cm |
| Viscosity | 1.5 cSt |
| Resistivity | 126.5 ohm · cm |
| pH-value | 8.7 |
| Example 6 (magenta ink) | |
| Demineralised water | 82.0 g |
| Polyethylene glycol MW 200 | 9.5 g |
| 1-methyl-2-pyrrolidone | 1.0 g |
| Polyethylene glycol phenyl ether | 0.5 g |
| LiCl | 0.5 g |
| Sumitomo J-I-M10 (Dye) | 1.5 g |
| Heliorot GZ (pigment) | 5.0 g |
| Surface tension | 38.9 dynes/cm |
| Viscosity | 1.6 cSt |
| Resistivity | 1.28.7 ohm · cm |
| pH-value | 7.5 |

Figure 2:
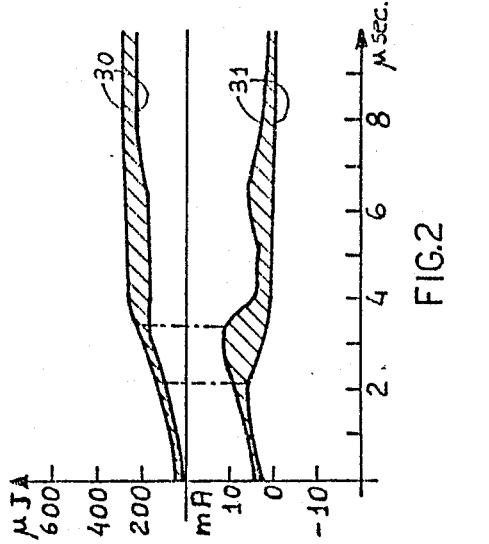
FIG. 2 shows diagrams illustrating the electrothermal characteristics of an ink according to the invention.

The effect regarding electrical and thermal stabilisation of the inks containing a certain amount of pigments will be apparent from the graphs shown in FIG. 2. In FIG. 2 the graph 30 indicates the range in which the absorption of electrical energy during the heating phase using the ink according to Example 2 falls while graph 31 shows the range in which the relative current absorption falls.

Figure 3:
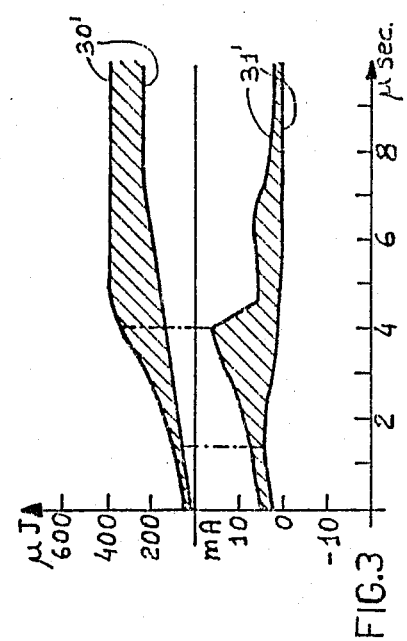

FIG. 3 shows the ranges 3' and 31' in respect of absorption of energy and current for an ink similar to that of Example 1 but which does not include the pigment.

Figure 4:
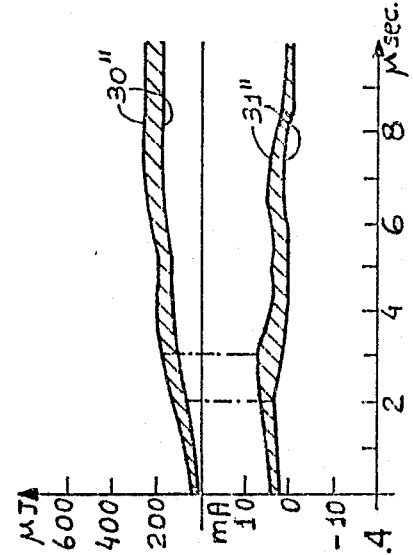
FIGS. 3 and 4 are similar diagrams to those shown in FIG. 2, which are obtained by means of two similar inks but in which the teaching according to the invention is not used.

Finally FIG. 4 shows the ranges 30∝1 and 31" in respect of absorption of energy and current for an ink similar to that of Example 1 but which does not use Fastusol Schwarz 18L but only Aquablak 135, in a proportion of 22%.

The reversal of the slope in graph 31 in FIG. 2 in respect of current indicates the beginning of vaporisation. At the times at which that change in slope is found to occur, both for the maximum curve and for the minimum curve in graph 31, it is possible to detect on the curves 30 the corresponding values in respect of energy absorbed by the ink, to achieve vaporisation. The space between those two values in respect of energy defines the variability in boiling temperature, since the latter is proportional to the absorbed energy.

In the case shown in FIG. 2, the ratio between the maximum and the minimum of that spacing is of a value of 2, in FIG. 3 it is of a value of 3, while in FIG. 4 it is of a value of 1.5. In graph 31' in FIG. 3 therefore temperature variability is very wide and has a duration in respect of time of between 1.5 and 4 μs. The graph 31" in FIG. 4 shows a reduced degree of variability in respect of absorbed energy and thus boiling temperature. However the ink gives rise at the front edge of the nozzle to an undesirable accumulation of pigment which can foul the paper and give rise to other printing irregularities. Therefore the ink in which the colouring element is formed only by pigment, given the high level of concentration required for the pigment, cannot be used.

The inks according to the invention use a concentration of pigment which is almost irrelevant from the point of view of optical density of the printed dots, but it is such as to stabilise the electrothermal phenomenon without causing traces of clogging. It has been verified that such stabilisation is independent of the chemical species of the material used as the pigment, so that it can also be relaced by any solid particles of a diameter of less than 1000 Å and such as to promote anchoring of the gaseous nuclei of the gases dissolved in the ink.

We claim:

1. A water based ink which is particularly suited for an ink jet printer of the type in which expulsion of the droplets of ink is caused by on-demand production of instantaneous vaporisation of a portion of ink in a nozzle to form bubbles of vapor, the ink essentially comprising an aqueous solution of a direct dye in a mixture of water and glycol wetting agents, characterised in that the ink comprises a solid material which is finely crushed so as to produce particles of dimensions between 400 and 1000 Å in a level of concentration of between 0.1 and 2% by weight of the ink, this material being held in dispersion and being capable of anchoring gaseous nuclei of gases dissolved in the ink, whereby the inertia of the ink upon change in phase is reduced and its boiling temperature is regularised, thus promoting the formation of bubbles of vapor.

2. An ink according to claim 1, characterised in that the solid material is formed by a pigment of a similar colour compatible with that of the direct dye.

3. An ink according to claim 2, characterised in that the pigment is added in the form of a 30% dispersion in water to said mixture of wetting agent and water.

4. An ink according to claim 2 characterised in that the ratio between the anhydrous pigment and the anhydrous dye is between 1/15 and 6/1.

5. An ink according to claim 4, characterised in that it has at 25° C. a level of resistivity of between 110 and 140 ohm-cm, a viscosity of between 1.5 and 3.5 cSt, a surface tension of between 35 and 45 dynes/cm and a pH-value of between 6.8 and 8.7.

6. An ink according to claim 4, characterised in that the dye is in a concentration of between 0.1 and 10% by weight, the wetting agent essentially comprising polyethylene glycol of a molecular weight of 200, in a proportion of between 7 and 30%.

7. An ink according to claim 6 characterised in that it comprises an ether glycol in a proportion of about 0.5% to facilitate penetration of the ink into the paper and to reduce the drying time.

8. An ink according to claim 7, characterised in that the ether glycol is formed by polyethylene glycol phenyl ether.

9. An ink according to claim 7 characterised in that it comprises a solubilising agent derived from pyrrolidone in a proportion of around 1%, the dye being present in a percentage of between 0.25 and 2.5% by weight of the ink.

* * * * *